Oct. 25, 1938.  A. C. MAYO ET AL  2,134,308
PROTECTIVE DEVICE FOR PHOTOGRAPHIC CAMERAS
Filed Jan. 10, 1938  2 Sheets-Sheet 1
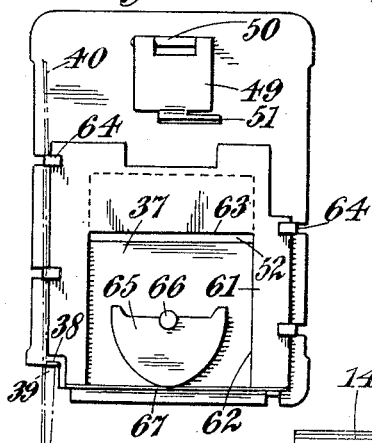
Fig.3.
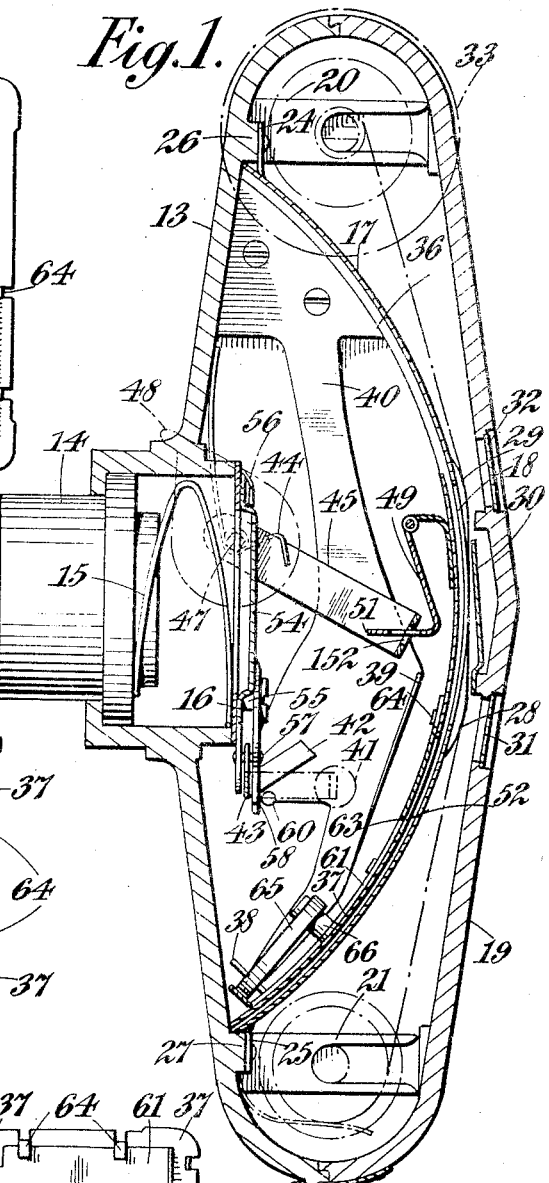
Fig.1.
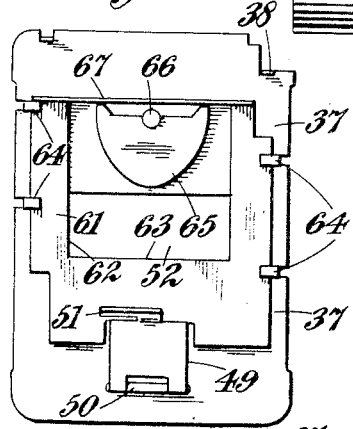
Fig.5.
Fig.4.
INVENTORS
ALFRED CROGER MAYO and
JOSEPH TERRETT
By Stebbins, Blenker & Parmelee
ATTORNEYS Oct. 25, 1938.  A. C. MAYO ET AL  2,134,308
PROTECTIVE DEVICE FOR PHOTOGRAPHIC CAMERAS
Filed Jan. 10, 1938

INVENTORS
ALFRED CROSER MAYO and
JOSEPH TERRETT

ATTORNEYS

Patented Oct. 25, 1938

2,134,308

UNITED STATES PATENT OFFICE 2,134,308

PROTECTIVE DEVICE FOR PHOTOGRAPHIC CAMERAS

Alfred Croger Mayo, Richmond, and Joseph Terrett, London, England, assignors to Purma Cameras Limited, London, England, a British company Application January 10, 1938, Serial No. 184,196
In Great Britain February 6, 1937

4 Claims. (Cl. 95—55)

This invention comprises improvements in or relating to protective devices for photographic cameras. In United States Patent No. 2,017,979 there is described a camera shutter in which a sliding plate working close to the film surface constitutes a shutter plate and in which an auxiliary safety shutter is employed close behind the lens to cut off any light from reaching the shutter-plate during the time in which the latter is being set and also during the time in which the camera is out of use. Operative connections between the release for the sliding shutter-plate and the auxiliary safety shutter are provided so that the safety shutter is moved out of the way before the sliding shutter-plate makes an exposure.

In the camera described in the aforesaid patent the lens is movably mounted so that it can be withdrawn into the camera case when not required for use and advanced into operative position, that is to say the position where the image is accurately focussed on the plane of the sensitive surface, when the camera is to be used. It is an object of the present invention to ensure that the shutter cannot be released except when the lens is in operative position.

To this end according to the present invention the auxiliary safety shutter is interlocked with the lens mounting so that when the lens is retracted the shutter is prevented from operating.

Preferably the auxiliary safety shutter is provided with a recess to receive the back end of the lens mounting and the lens mounting is so dimensioned and positioned that when it is retracted into the camera it enters the recess in the safety shutter.

The present invention is herein described as incorporated in a camera such as that described in co-pending United States patent application Serial No. 150,924 filed on June 29, 1937, in the name of one of the present applicants and it is to be understood that no claim is made herein to the invention described in the said co-pending application, the present invention comprising interlocking devices between the lens and shutter as set forth in the appended claims. The invention is not, however, limited to its employment in a camera of the particular construction described and the following is a description, by way of example only, of one construction in accordance with the invention as incorporated in the camera described in the aforesaid application.

In the accompanying drawings:—

Figure 1 is a longitudinal central section through a camera;

Figures 3, 4 and 5 are details showing the shutter-plate in various positions.

Figure 6:
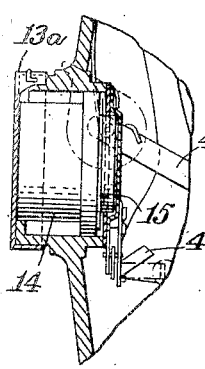
Figure 6 is a detail view partially in section and to a different scale showing the lens cap in position.

The general arrangement of the parts of the camera is similar to that described in the aforesaid United States patent, but the construction illustrated is arranged to be made up from mouldable material instead of being built up from sheet steel. The camera has two flat side plates 11, 12 between which extends a front 13, moulded in one piece with the side plates and carrying a lens mount 14. The lens mount is capable of being slid telescopically in the front 13 and is yieldingly pressed forward by a spring 15. It is held inward by a cap 13a when the camera is not in use, as described in the aforesaid patent and illustrated in Figure 6. At the back of the lens mount there is a diaphragm plate 16 pierced with a rectangular aperture for the passage of the light from the lens.

Behind the front plate 13 and extending from side to side between the side plates there is a curved film guide-plate 17 having a picture-aperture 18 of the desired size of the pictures to be taken by the camera. The guide-plate 17 is concave on the side towards the lens so that in the centre portion, where the picture-aperture is, it is close to the back 19 of the camera, while towards its ends it sweeps forward close behind the front plate 13 so as to come in front of and shield off the mountings 20, 21 which are provided for the film spools. The guide-plate 17 rests on inwardly projecting locating ribs or flanges 22, 23 (Figure 2) which serve to locate it accurately in position and it is secured by lugs 24, 25 resting on moulded abutments 26, 27. It will be observed that the guide-plate 17 is thickened a little on each side of the picture-aperture 18 as indicated at 28, 29, so that the film which passes over the guide-plate is flattened where it comes opposite the picture-aperture, although the guide-plate even over the thickened portions 28, 29 is still slightly concave towards the lens, although not enough to carry the film sensibly out of the plane of focus of the lens. A spring 30 on the back 19 of the camera serves to press the film closely against the guides. Number-windows 31, 32 are provided in the camera back. A film-winder 33 is provided but is let flush into the side wall 12 of the camera. This side wall is moulded considerably thicker than the other side wall 11 so as to permit the operating parts to be located flush within the thickness of the side wall. An optical view-finder 34 is also located within the thickness of this wall.

The back cover-plate 19 is, of course, made readily detachable for loading purposes and is made to fit in a light-tight manner against the side walls and front 13 of the camera.

In front of the guide-plate 17 the side walls 11, 12 have further inwardly projecting ledges 35, 36 which are spaced somewhat from the guide-plates 17 and in this space the edges of a curved shutter-plate 37 are guided so as to slide freely. The shutter-plate 37 is provided with an abutment 38 which can be engaged, when the shutter-plate is at one extremity of its movement by a trip member 39 formed as part of a flat spring 40 secured to the side plate 11 of the camera. The trip member is operatively connected to a release-trigger 41 the head of which projects through the side-plate 12 to the outside thereof. The connections between the release-trigger and the trip 39 comprise a head 42 on the shank 43 of the trigger 41, which head comes opposite a portion of the spring 40, but in the normal position of the trigger is separated therefrom by a certain space so that there is a lost-motion before the trigger operates the trip. The shutter-plate 37 is urged in a direction away from that in which it would be held by the trip-member 39, that is to say in a downward direction in Figures 1 and 2, by means of a shutter spring 44 and it is capable of being wound back against the spring 44 into the "set" position by a lever 45 pivoted at 46, 47 in the side-plates 11, 12 and connected to a setting arm 48 recessed into the outside of the side-plate 12. The setting lever 45 is operatively connected to the shutter-plate 37 by a link 49 pivoted to the shutter-plate at 50 (Figure 3) and provided with a hook 51 which enters a slot 152 in the lever 45. This makes a detachable slot connection with the lever 45, which is very convenient in assembling the parts. It will be observed that the pivots 46, 47 of the setting lever 45 lie on an axis which is parallel to the axis of curvature of the shutter-plate 37 and that the shutter spring 44 acts on the shutter through the intermediary of the lever 45 and the link 49.

The shutter-plate itself is provided with an exposure-slit 52, best seen in Figure 5, although also visible in Figure 1. If this were the whole of the shutter mechanism it would, of course, be impossible to set the shutter-plate 37 by means of the setting lever mechanism 48, 45 without first capping the lens; otherwise the film would be exposed in the act of setting the shutter.

Figure 2:
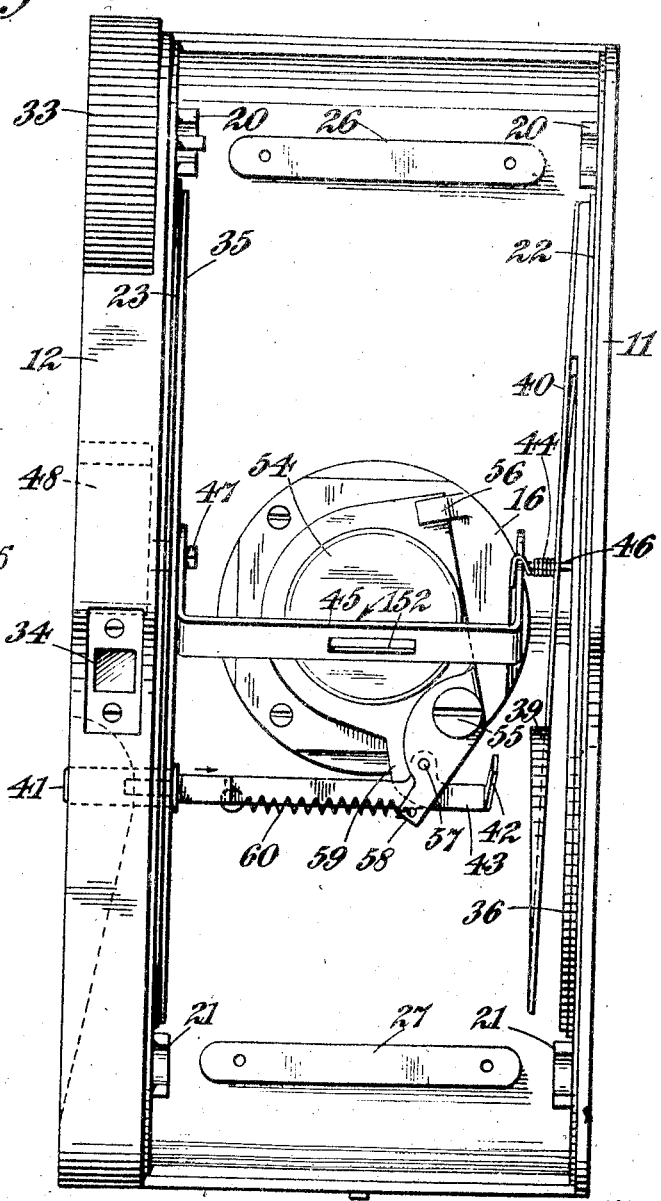
Figure 2 is an elevation of a camera from the back with the back cover and guide-plate removed.

However, the trigger 41 is provided with operative connections to a safety shutter-plate 54. The safety shutter 54 is pivoted at 55 to the rear of the diaphragm plate 16 at the back of the lens mount and is capable, as shown in Figure 2, of closing the aperture in the diaphragm, or alternatively of being swung out of the way by movement in the direction of the arrow marked upon it in Figure 2. The edge of the safety shutter 54 which is remote from the pivot 55 enters beneath an overlapping lug 56 on the diaphragm plate 16 when the plate is closed and this keeps it closed against the diaphragm plate. The stem 43 of the trigger 41 carries a laterally projecting lug which is pivoted at 57 between an arm 58 and a second arm 59 projecting from the safety shutter 54. The length of this arm, relatively to the extent of movement permitted to the trigger 41 is such as to give a velocity ratio between the movement of the trigger and the movement of the safety shutter adequate to move the safety shutter completely out of the way of the lens 14 before the lost-motion between the foot 42 of the stem 43 and the spring 40 has been taken up and the shutter-plate 37 released. The return of the trigger 41 and of the safety shutter 54 to the position shown in Figure 2, when pressure on the trigger is released, is ensured by a spring 60 engaged at one end with the stem 43 of the trigger and at the other end with the extremity of the arm 58. On the front of the shutter-plate 37 is mounted a smaller sliding plate 61 for varying the width of the exposure-slit 52 in the shutter-plate. This auxiliary sliding plate 61 has an aperture 62, one edge 63 of which is capable of being moved so as to overlap more or less the exposure-slit 52. It is held on the shutter-plate by overlapping lugs 64. Three different widths of slit are shown in Figures 3, 4 and 5 corresponding to different positions of adjustment of the sliding plate 61.

In the drawings there is illustrated means for moving the sliding shutter-plate which comprise a heart-shaped cam 65 pivoted at 66 in the shutter-plate 37. The cam 65 is made sufficiently heavy always to hang with its rounded point lowermost. This presses against an upturned edge 67 of the sliding plate 61. When the camera is held upright in the positions shown in Figures 1, 2 and 3 the point of the cam presses the sliding plate 61 to the position where the exposure-slit is narrowest. If the camera is turned in a horizontal position, either side up, the cam will assume a position such as is illustrated in Figure 4, in which the sliding plate is permitted to move to a position where the slit is wider, and if the camera is inverted the parts assume the position shown in Figure 5, where the exposure-slit is at its widest. No spring is provided for drawing the sliding plate 61 against the cam because the inertia of the plate causes it to lag behind the movements of the shutter-plate 37 even when the camera is held horizontally, and during the exposure movement of the shutter when the trigger 41 is pressed this carries the upturned edge 67 back into firm engagement with the cam. When the camera is held vertically the weight of the sliding plate 61 ensures it occupying the position shown.

It will be observed that there is a recess in the safety shutter-plate 54 which is co-axial with the lens mount 14. The purpose of this recess is to receive the back of the lens mount when the latter is pressed back into the camera by the use of the cap over the shutter and to thereby cause the lens mount to interlock with the shutter member and prevent operation of the shutter when the cap is in place.

It will be found that the location of the trigger 41 for the release of the shutter is convenient when the user of the camera is holding it close to his eye so that he can look through the view-finder 34 because the trigger 41 comes into a convenient position for operation by the forefinger of the hand holding the camera.

It will be seen that the present invention ensures that the shutter cannot be released with the cap in place and thus lead to a loss in the exposure of the film.

We claim:—

1. In a camera the combination of a camera body a shutter-plate movably mounted therein so as to work close to the focal plane of the camera, a lens mounting in the front of the camera body capable of moving forward into operative position or of being retracted into the body when not in use, an auxiliary safety shutter-plate within the camera body behind the lens mounting, said auxiliary shutter-plate being mounted for movement parallel to its own plane transverse to the lens axis, a release for the shutter-plate, which release is also operatively connected to the auxiliary safety shutter-plate so as to move it out of the way from behind the lens mounting before releasing the shutter-plate and an abutment upon the auxiliary safety shutter-plate to engage the back of the lens mounting when the lens mounting is in its retracted position to prevent movement of said auxiliary shutter-plate.

2. A camera as claimed in claim 1, wherein the auxiliary safety shutter comprises a recess one edge of which constitutes the abutment aforesaid and receives the back end of the lens mounting itself when the lens mounting is retracted into the camera.

3. A camera as claimed in claim 1, in combination with means for engaging the lens mounting and the camera body so as to press and lock the lens mounting in retracted position.

4. A camera in accordance with claim 1, wherein the safety shutter is pivoted for movement about an axis parallel to the lens axis and wherein a latch is located to overhang the side of the safety shutter-plate remote from the pivot when the safety shutter is in its closed position, and thus hold the auxiliary shutter-plate from lateral displacement out of its own plane under pressure exerted against the abutment.

ALFRED CROGER MAYO.
JOSEPH TERRETT.